US009699171B1

(12) United States Patent
Sokolov et al.

(10) Patent No.: US 9,699,171 B1
(45) Date of Patent: Jul. 4, 2017

(54) SYSTEMS AND METHODS FOR LOGGING OUT OF CLOUD-BASED APPLICATIONS MANAGED BY SINGLE SIGN-ON SERVICES (71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 68 days.

(21) Appl. No.: 14/312,675

(22) Filed: Jun. 23, 2014

(51) Int. Cl.
*H04L 29/06* (2006.01)
*G06F 21/50* (2013.01)
(52) U.S. Cl.
CPC .......... *H04L 63/0815* (2013.01); *G06F 21/50* (2013.01)
(58) Field of Classification Search
CPC ....... G06F 21/50; G06F 21/41; H04L 63/0815
USPC .......................................................... 726/8
See application file for complete search history.

(56) References Cited

U.S. PATENT DOCUMENTS

| 7,673,045 B1* | 3/2010 | Battle | G06F 21/41 709/219 |
| 2010/0024015 A1* | 1/2010 | Hardt | H04L 67/14 726/6 |
| 2014/0075521 A1* | 3/2014 | Ma | H04L 63/061 726/4 |
| 2014/0082715 A1* | 3/2014 | Grajek | H04L 63/0815 726/8 |
| 2014/0189839 A1* | 7/2014 | Jezek | H04L 63/0815 726/8 |
| 2015/0350338 A1* | 12/2015 | Barnett | H04L 67/22 709/203 |

OTHER PUBLICATIONS

"Shibboleth", https://shibboleth.net/, as accessed Jun. 25, 2014, (Feb. 25, 2001).
"Single sign-on", http://en.wikipedia.org/wiki/Single_sign-on, as accessed Apr. 25, 2014, Wikipedia, (Sep. 7, 2004).
"Security Assertion Markup Language", http://en.wikipedia.org/wiki/Security_Assertion_Markup_Language, as accessed Apr. 25, 2014, Wikipedia, (Dec. 15, 2005).

(Continued)

*Primary Examiner* — Benjamin Lanier
(74) *Attorney, Agent, or Firm* — FisherBroyles LLP (57) ABSTRACT

The disclosed computer-implemented method for logging out of cloud-based applications managed by single sign-on services may include (1) identifying an attempt by a single sign-on service to log a user out of a set of cloud-based applications, (2) in response to identifying the attempt to log the user out of the set of applications, tracking a logout status of each application within the set of cloud-based applications by, for each application (a) identifying a logout request sent by the single sign-on service to the application and (b) determining whether the application has sent a logout response to the single sign-on service that verifies that the user has been successfully logged out of the application, and (3) determining that the user is still logged into at least one application managed by the single sign-on service by determining that the application did not send a logout response to the single sign-on service.

20 Claims, 7 Drawing Sheets (56) References Cited

OTHER PUBLICATIONS

Cantor, Scott et al., "Assertions and Protocols for the OASIS Security Assertion Markup Language (SAML) V2.0", http://docs.oasis-open.org/security/saml/v2.0/saml-core-2.0-os.pdf, as accessed Apr. 25, 2014, OASIS Standard, OASIS Open, (Mar. 15, 2005).
"OpenID", http://openid.net/, as accessed Apr. 25, 2014, (Sep. 2, 2001).
"OAuth", http://oauth.net/, as accessed Apr. 25, 2014, (Sep. 14, 2007).

\* cited by examiner

SYSTEMS AND METHODS FOR LOGGING OUT OF CLOUD-BASED APPLICATIONS MANAGED BY SINGLE SIGN-ON SERVICES

BACKGROUND

Traditional single sign-on services often allow users to access multiple independent services (such as cloud-based applications) via a single authentication process. For example, once a user has been successfully authenticated by a single sign-on service, the single sign-on service may automatically assert the identity of the user to additional services to enable the user to access these services without having to complete separate authentication processes for each service. As an example, by logging into a GOOGLE or FACEBOOK account, a user may gain access to additional third-party services, such as an email service, an instant messaging service, a social media profile, etc., without having to separately log into each service. As a result, single sign-on services may increase the speed and ease with which users access multiple services and applications.

While traditional single sign-on services also often provide single sign-out services, these sign-out services often expose users to a variety of privacy and security threats. For example, an application that was accessed by a single sign-on service may be unresponsive or unavailable when the single sign-on service attempts to log the user out of the application. In addition, the user may inadvertently leave open one or more browser tabs or windows that contain instances of services or applications managed by the single sign-on service. Unfortunately, if a user remains logged into an application on an unsecure computing device and/or network connection, malicious users or entities may access sensitive and confidential data managed by the application. As such, the current disclosure identifies and addresses a need for more efficient and effective systems and methods for logging out of services and applications managed by single sign-on services.

SUMMARY

As will be described in greater detail below, the instant disclosure describes various systems and methods for verifying that a user has been successfully logged logging out of cloud-based applications managed by single sign-on services service by tracking both logout requests distributed by the single sign-on service to the cloud-based applications and the logout responses distributed from these cloud-based applications.

In one example, a computer-implemented method for performing such a task may include (1) identifying an attempt by a single sign-on service to log a user out of a set of cloud-based applications managed by the single sign-on service, (2) in response to identifying the attempt to log the user out of the set of cloud-based applications, tracking a logout status of each application within the set of cloud-based applications by, for each application (a) identifying a logout request sent by the single sign-on service to the application and (b) determining whether the application has sent a logout response to the single sign-on service that verifies that the user has been successfully logged out of the application, and (3) determining that the user is still logged into at least one application managed by the single sign-on service by determining that the application did not send a logout response to the single sign-on service that verifies that the user has been successfully logged out of the application.

In some examples, determining that the application did not send the logout response to the single sign-on service may include determining that the application did not send the logout response within a predetermined amount of time. Additionally or alternatively, determining that the application did not send the logout response to the single sign-on service may include determining that the application was unresponsive at the time the single sign-on service sent the logout request.

In some embodiments, tracking the logout status of each application may further include presenting to the user, via a graphical user interface, the number of applications that the single sign-on service is attempting to log the user out of and the number of applications that the user has been successfully logged out of. In such embodiments, presenting to the user the number of applications that the user has been successfully logged out of may include dynamically updating the number of applications that the user has been successfully logged out of as each logout response is received by the single sign-on service.

In some examples, in response to determining that the user is still logged into the application, the method may further include notifying the user that the user is still logged into the application and prompting the user to log out of the application. In these examples, prompting the user to log out of the application may include prompting the user to log out of the application directly instead of logging out of the single sign-on service and/or prompting the user to close an open browser window rendering the application.

In some embodiments, the method may ultimately include determining that the user has been successfully logged out of the application. In such embodiments, in response to determining that the user has been successfully logged out of the application, the method may include notifying the user that the user has been successfully logged out of each of the set of cloud-based applications managed by the single sign-on service.

In one embodiment, a system for implementing the above-described method may include (1) an identification module that identifies an attempt by a single sign-on service to log a user out of a set of cloud-based applications managed by the single sign-on service, (2) a tracking module that, in response to identifying the attempt to log the user out of the set of cloud-based applications, tracks a logout status of each application within the set of cloud-based applications by, for each application (a) identifying a logout request sent by the single sign-on service to the application and (b) determining whether the application has sent a logout response to the single sign-on service that verifies that the user has been successfully logged out of the application, and (3) a determination module that determines that the user is still logged into at least one application managed by the single sign-on service by determining that the application did not send a logout response to the single sign-on service that verifies that the user has been successfully logged out of the application. In addition, the system may include at least one processor that executes the identification module, the tracking module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an attempt by a single sign-on service to log a user out of a set of cloud-based applications managed by the single sign-on service, (2) in response to identifying the attempt to log the user out of the set of cloud-based applications, track a logout status of each application within the set of cloud-based applications by, for each application (a) identifying a logout request sent by the single sign-on service to the application and (b) determining whether the application has sent a logout response to the single sign-on service that verifies that the user has been successfully logged out of the application, and (3) determine that the user is still logged into at least one application managed by the single sign-on service by determining that the application did not send a logout response to the single sign-on service that verifies that the user has been successfully logged out of the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for logging out of cloud-based applications managed by single sign-on services. As will be explained in greater detail below, by tracking both logout requests distributed by a single sign-on service to a set of cloud-based applications and the logout responses distributed from these cloud-based applications, the disclosed systems and methods may determine whether a user has been successfully logged out of each of the applications. If a user is not successfully logged out of an application, the systems and methods described herein may prompt the user to log out of the application. As such, the disclosed systems and methods may ensure that a user does not inadvertently remain logged into an application, therefore increasing the safety and security of information stored within the application.

The following will provide, with reference to FIGS. 1-2 and 4-5, detailed descriptions of exemplary systems for logging out of cloud-based applications managed by single sign-on services. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
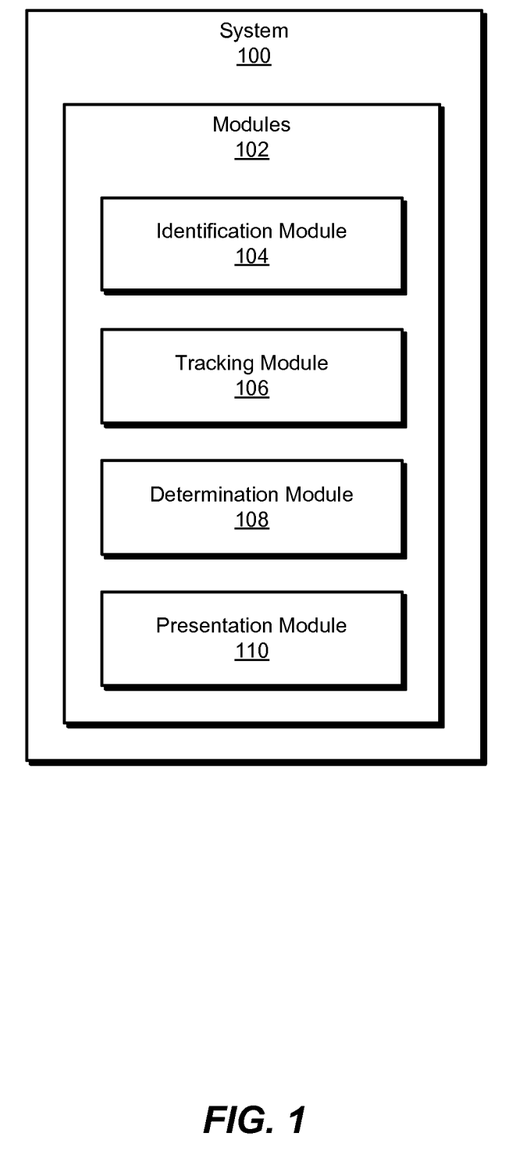
FIG. 1 is a block diagram of an exemplary system for logging out of cloud-based applications managed by single sign-on services.

FIG. 1 is a block diagram of an exemplary system 100 for logging out of cloud-based applications managed by single sign-on services. As illustrated in this figure, exemplary system 100 may include one or more modules 102 for performing one or more tasks. For example, and as will be explained in greater detail below, exemplary system 100 may include an identification module 104 that identifies an attempt by a single sign-on service to log a user out of a set of cloud-based applications managed by the single sign-on service. Exemplary system 100 may also include a tracking module 106 that, in response to identifying the attempt to log the user out of the set of cloud-based applications, tracks a logout status of each application within the set of cloud-based applications by, for each application (1) identifying a logout request sent by the single sign-on service to the application and (2) determining whether the application has sent a logout response to the single sign-on service that verifies that the user has been successfully logged out of the application.

In addition, and as will be described in greater detail below, exemplary system 100 may include a determination module 108 that determines that the user is still logged into at least one application managed by the single sign-on service by determining that the application did not send a logout response to the single sign-on service that verifies that the user has been successfully logged out of the application. Finally, exemplary system 100 may include a presentation module 110 that presents to the user, via a graphical user interface, the progress of logging the user out of the set of cloud-based applications. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
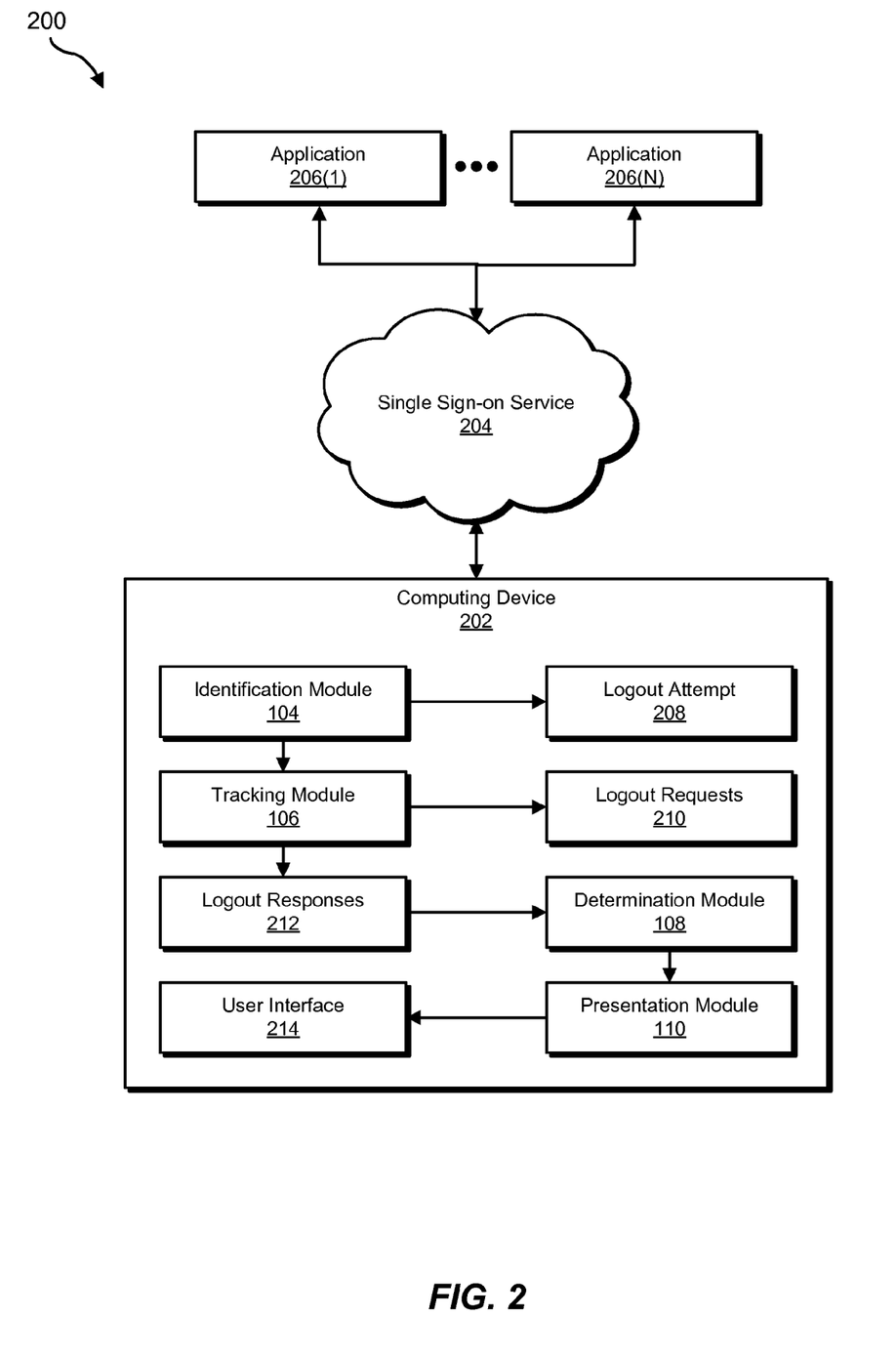
FIG. 2 is a block diagram of an additional exemplary system for logging out of cloud-based applications managed by single sign-on services.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with applications 206(1)-(N) via a single sign-on service 204. In one example, computing device 202 may be programmed with one or more of modules 102 in order to detect an attempt by single sign-on service 204 to log a user out of one or more of applications 206(1)-(N) that are rendered on computing device 202. Additionally or alternatively, one or more servers hosting applications 206(1)-(N) may be programmed with one or more of modules 102 in order to track logout requests and logout responses distributed to and from applications 206(1)-(N).

In one embodiment, one or more of modules 102 from FIG. 1 may, when executed by at least one processor of computing device 202, enable computing device 202 to log out of cloud-based applications managed by single sign-on services. For example, and as will be described in greater detail below, identification module 104 may cause computing device 202 to identify an attempt (e.g., logout attempt 208) by a single sign-on service (e.g., single sign-on service 204) to log a user out of a set of cloud-based applications (e.g., applications 206(1)-(N)) managed by the single sign-on service. In addition, in response to identifying the attempt to log the user out of the set of cloud-based applications, tracking module 106 may track a logout status of each application within the set of cloud-based applications by, for each application (1) identifying a logout request (e.g., one of logout requests 210) sent by the single sign-on service to the application and (2) determining whether the application has sent a logout response (e.g., one of logout responses 212) to the single sign-on service that verifies that the user has been successfully logged out of the application. Furthermore, determination module 108 may cause computing device 202 to determine that the user is still logged into at least one application managed by the single sign-on service by determining that the application did not sent a logout response to the single sign-on service that verifies that the user has been successfully logged out of the application.

Computing device 202 generally represents any type or form of computing device capable of reading computer-executable instructions. In some examples, computing device 202 may render one or more of applications 206(1)-(N) within a web browser installed on computing device 202. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Single sign-on service 204 generally represents any type or form of internet protocol, software system, or shared authentication scheme that asserts the identity of a user or other entity to multiple applications. For example, when a "principal" (e.g., a user) requests access to a service from a service provider (e.g., an application), single sign-on service 204 may verify the identity of the user to the service. Specifically, the service provider may request that an identify provider within single sign-on service 204 send an "assertion" that verifies the identity of the user. The service provider may then grant access to the user in response to receiving the assertion.

In some examples, a user may enter login credentials (e.g., a username and/or password) to access one application (e.g., a "session authority"). Single sign-on service 204 may then verify the credentials to additional applications (e.g., "session participants" or "relying parties") managed by single sign-on service 204. In this way, a user who logs into a web-based account (e.g., a GOOGLE account) may be seamlessly logged into and/or allowed access to multiple applications within and/or related to the account (e.g., an email service, an instant messaging service, a calendar service, etc.).

Similarly, when the user attempts to log out of one or more applications managed by single sign-on service 204, single sign-on service 204 may facilitate a "single logout process" that logs the user out of each accessed application. Specifically, single sign-on service 204 may distribute logout requests (e.g., logout requests 210 in FIG. 2) to each application. If the single logout process originated at a session authority, single sign-on service 204 may distribute logout requests directly in response to detecting the logout process. However, if the single logout process originated at a relying party, the relying party may first send a request to single sign-on service 204, which may prompt single sign-on service 204 to distribute logout requests to the remaining relying parties. When a relying party receives a logout request and successfully logs the user out of the relying party, the relying party may return a logout response (e.g., one of logout responses 212 in FIG. 2) to single sign-on service 204 that verifies the successful logout. Examples of single sign-on service 204 include, without limitation, Security Assertion Markup Language (SAML) protocols, ONELOGIN, UBUNTU SINGLE SIGN ON, and MICROSOFT ACCOUNT.

In some examples, single sign-on service 204 may facilitate single sign-on and single logout processes for one or more of applications 206(1)-(N). Applications 206(1)-(N) generally represent any type or form of cloud-based application or service that may be accessed by a user via a network. Applications 206(1)-(N) may be hosted on the same server or multiple servers. In addition, one or more of applications 206(1)-(N) may be contained within and/or accessed via another of applications 206(1)-(N). Examples of applications 206(1)-(N) include, without limitation, applications associated with LINKEDIN, DROPBOX, FACEBOOK, and GOOGLE accounts.

Figure 3:
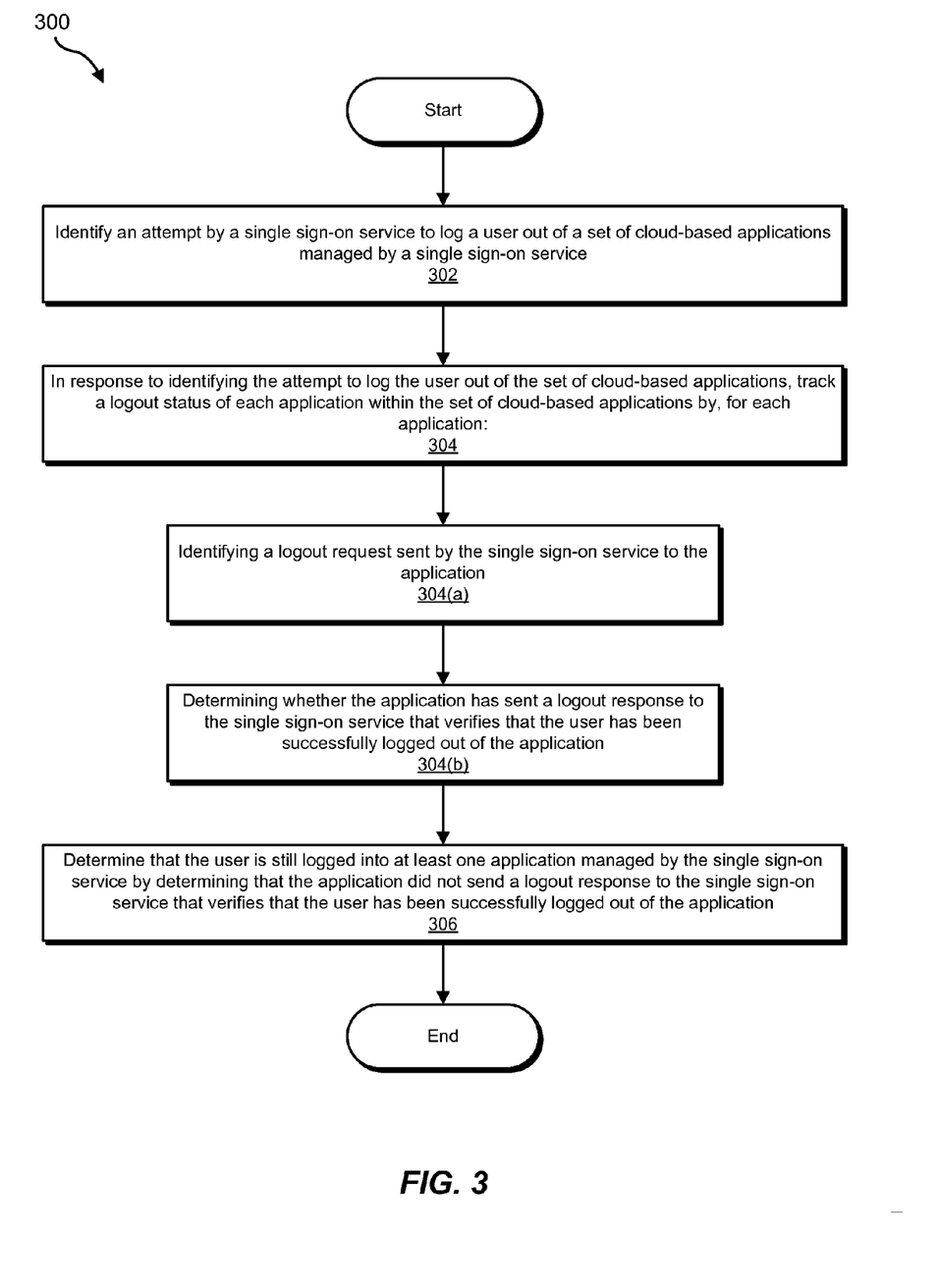
FIG. 3 is a flow diagram of an exemplary method for logging out of cloud-based applications managed by single sign-on services.

FIG. 3 is a flow diagram of an exemplary computer-implemented method 300 for logging out of cloud-based applications managed by single sign-on services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an attempt by a single sign-on service to log a user out of a set of cloud-based applications managed by the single sign-on service. For example, identification module 104 may, as part of computing device 202 in FIG. 2, identify a logout attempt 208 by single sign-on service 204 to log the user out of applications 206(1)-(N).

The systems described herein may identify the attempt to log the user out of the set of cloud-based applications in a variety of ways. In some examples, identification module 104 may identify logout attempt 208 by determining that the user has initiated logout attempt 208. For example, identification module 104 may determine that the user has closed one or more browser windows rendering at least one of applications 206(1)-(N). In addition, identification module 104 may determine that the user has attempted to manually log out (e.g., by clicking on a "log out" or "sign out" button) of one or more of applications 206(1)-(N). In some examples, determination module 108 may determine that the user is attempting to log out of an application that represents a session authority. In other examples, determination module 108 may determine that the user is attempting to log out of one or more applications that represent relying parties.

In some embodiments, identification module 104 may identify logout attempt 208 by determining that single sign-on service 204 is attempting to log the user out of applications 206(1)-(N) automatically (i.e., without direction from the user). For example, identification module 104 may determine that single sign-on service 204 and/or one of applications 206(1)-(N) has issued logout attempt 208 in response to detecting a lack of user activity within applications 206(1)-(N) for a predetermined amount of time (e.g., 15 minutes).

Additionally or alternatively, identification module 104 may identify logout attempt 208 by detecting logout requests 210 distributed to applications 206(1)-(N). For example, detecting logout requests 210 may serve as an indication that a user and/or application has initiated logout attempt 208. The term "logout request," as used herein, generally refers to any type or form of electronic message, data, or executable code that prompts a receiving party to initiate logging or signing a user out of an application, deleting or removing data stored in an application associated with a user, or otherwise revoking a user's access to an application. As explained previously, single sign-on service 204 and/or a session authority may distribute logout requests 210 to applications 206(1)-(N) in response to detecting an attempt to log a user out of a session authority and/or in response to receiving a request from a relying party.

Identification module 104 may detect logout requests 210 in a variety of ways. In some examples, identification module 104 may be unable to directly communicate with applications 206(1)-(N) to identify logout requests 210 at applications 206(1)-(N) due to cross-domain restrictions (i.e., identification module 104 and single sign-on service 204 and/or one or more of applications 206(1)-(N) may be hosted in different domains). Therefore, identification module 104 may determine that single sign-on service 204 distributes logout requests 210 via a client agent or browser that facilitates communication between single sign-on service 204 and applications 206(1)-(N). Specifically, in some examples, identification module 104 may detect logout requests 210 as single sign-on service 204 distributes logout requests 210 using HTTP redirects, HTTP POST requests, hidden frames, and/or any additional technique capable of communicating across domains.

In addition, in some examples, identification module 104 may identify the name and/or number of applications within the set of applications that single sign-on service 204 is attempting to log the user out of. Furthermore, in some embodiments, the systems described herein may present the progress of the logout process to the user via one or more graphical user interfaces.

The term "graphical user interface," as used herein, generally refers to any type or form of image, text, and/or audio notification presented to a user on a computing device. In some examples, a graphical user interface may convey information to the user, such as a logout status of one or more applications. Additionally or alternatively, a graphical user interface may request user input (e.g., clicking a button, entering text into an input field, etc.). Examples of graphical user interfaces include, without limitation, pop-up windows, icons rendered within web browsers, application menus, combinations of one or more of the same, and/or any additional graphical user interface.

In some examples, presentation module 110 may notify the user, via a user interface 214 in FIG. 2, that logout attempt 208 has been detected. In addition, presentation module notify the user, via user interface 214 or an additional user interface, of the name and/or number of applications involved in logout attempt 208. As will be explained in greater detail below, providing updates to the user about the progress of logging out of applications 206(1)-(N) may ensure that the user is efficiently and successfully logged out of each of applications 206(1)-(N).

Returning to FIG. 3, at step 304, 304(a), and 304(b), one or more of the systems described herein may, in response to identifying the attempt to log the user out of the set of cloud-based applications, track a logout status of each application within the set of cloud-based applications by, for each application (1) identifying a logout request sent by the single sign-on service to the application and (2) determining whether the application has sent a logout response to the single sign-on service that verifies that the user has been successfully logged out of the application. For example, tracking module 106 may, as part of computing device 202 in FIG. 2, track the logout status of each of applications 206(1)-(N) by (1) identifying each of logout requests 210 and (2) determining whether applications 206(1)-(N) have sent logout responses 212.

The term "logout status," as used herein, generally refers to any type or form of categorization, classification, or label that indicates whether a user is logged into an application. In some examples, a logout status may represent a binary classification (i.e., a user is either logged into or logged out of an application). For example, a logout status of "logged in" may indicate that a user, identity provider, or other entity has provided login credentials associated with the user to an application. In addition, a logout status of "logged out" may indicate that login credentials associated with the user have been revoked and/or that the user is no longer allowed access to an application.

The systems described herein may identify the logout requests sent to each application in a variety of ways. In some examples, tracking module 106 may identify logout requests 210 during or after identification module 104 identifies logout attempt 208. In addition, tracking module 106 may identify logout requests 210 at single sign-on service 204 as single sign-on service 204 distributes logout requests 210. Tracking module 106 may also identify logout requests 210 at applications 206(1)-(N) once applications 206(1)-(N) have received logout requests 210. Furthermore, as previously mentioned, tracking module 106 may identify logout requests 210 as logout requests 210 are distributed to applications 206(1)-(N) via a client agent.

Once tracking module 106 identifies logout requests 210, tracking module 106 may determine whether applications 206(1)-(N) send logout responses to single sign-on service 204. Similar to a logout request, the term "logout response," as used herein, generally refers to any type or form of electronic message, data, or executable code that indicates to single sign-on service 204 that a user has been successfully logged out of the application that sent the logout response. For example, a logout response may indicate that the application has removed and/or deleted data (e.g., cookies) that stored the login credentials of the user or otherwise allowed the user to access the application. In other words, a logout response sent from an application may indicate that the logout status of the application has been changed from "logged in" to "logged out."

Tracking module 106 may determine whether applications 206(1)-(N) have sent logout responses 212 in a variety of ways. For example, tracking module 106 may monitor single sign-on service 204 in order to detect the arrival of logout responses 212 at single sign-on service 204. In addition, tracking module 106 may monitor applications 206(1)-(N) to detect the distribution of logout responses 212 from applications 206(1)-(N). Additionally or alternatively, tracking module 106 may query and/or test applications 206(1)-(N) to determine whether the user is still logged into applications 206(1)-(N).

In some embodiments, tracking module 106 may wait to receive and/or attempt to identify logout responses 212 for a predetermined amount of time (e.g., 30 seconds) after single sign-on service 204 distributes logout requests 210. For example, tracking module 106 may allow time for logout requests 210 to be routed to applications 206(1)-(N) via a network and for logout responses 212 to be routed back to single sign-on service 204.

In examples where the systems described herein may be unable to directly identify logout requests 210 distributed to applications 206(1)-(N) due to cross-domain restrictions, the disclosed systems may also be unable to directly detect logout responses 212 distributed from applications 206(1)-(N). In these examples, tracking module 106 may identify logout responses 212 by identifying indications that single sign-on service 204 has received logout responses 212. For example, tracking module 106 may run a script (e.g., an AJAX application) in a client agent that distributes logout requests 210 and/or receives logout responses 212. In addition, tracking module 106 may implement a WEBSOCKET protocol to monitor communication between single sign-on service 204 and applications 206(1)-(N) and/or implement any additional technique to identify events indicative of receiving logout responses 212.

As mentioned previously, presentation module 110 may notify the user of the logout status of applications 206(1)-(N). For example, presentation module 110 may present to the user, via user interface 214, the name and/or number of applications that single sign-on service 204 is attempting to log the user out of. In addition, presentation module 110 may present to the user, via user interface 214 or an additional user interface, the name and/or number of applications that the user has been successfully logged out of. In some examples, presentation module 110 may present the number of applications that the user has been successfully logged out of by dynamically updating the number of successful logouts as single sign-on service 204 receives each of logout responses 212.

Figure 4:
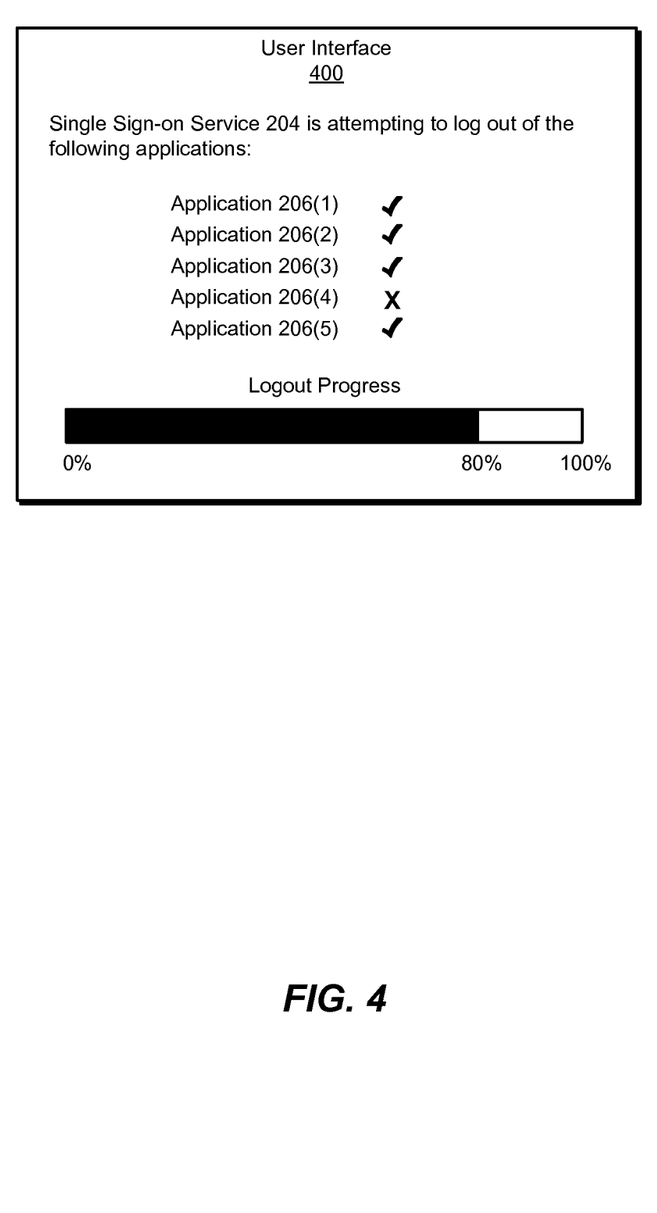
FIG. 4 is an illustration of an exemplary graphical user interface that displays the logout status of a set of cloud-based applications.

FIG. 4 shows user interface 400 as an example of user interface 214. In the example of FIG. 4, identification module 104 may determine that single sign-on service 204 is attempting to log a user out of five applications (i.e., applications 206(1)-(5)). As such, user interface 400 may present to the user the names of the five applications. In addition, user interface 400 may indicate the logout status of applications 206(1)-(5). For example, an "X" beside an application name may indicate that the application has a logout status of "logged in," while a check mark beside an application name may indicate that the application has a logout status of "logged out." In some examples, user interface 400 may initially display an X (or other indication) beside each application name, indicating that the logout status of applications 206(1)-(5) was "logged in" at the time identification module 104 identified logout attempt 208. Then, once tracking module 106 begins to identify logout responses 212, presentation module 110 may update the indications beside applications 206(1)-(5).

In this example, tracking module 106 may have identified logout responses sent from applications 206(1)-(3) and application 206(5) (but not yet identified a logout response sent from application 206(4)). Therefore, as shown in FIG. 4, user interface 400 may display check marks next to applications 206(1)-(3) and application 206(5), while displaying an X next to application 206(4). In addition, user interface 400 may display a progress bar that graphically indicates the logout progress of applications 206(1)-(5). In this example, the progress bar displayed in user interface 400 may indicate that the logout process is 80% complete. If tracking module 106 identifies a logout response sent from application 206(4) (e.g., within a predetermined amount of time), presentation module 110 may update the indication beside application 206(4) to display a check mark, as well as update the progress bar to 100%.

Returning to FIG. 3, at step 306 one or more of the systems described herein may determine that the user is still logged into at least one application managed by the single sign-on service by determining that the application did not send a logout response to the single sign-on service that verifies that the user has been successfully logged out of the application. For example, determination module 108 may, as part of computing device 202 in FIG. 2, determine that the user is still logged into an application managed by single sign-on service 204 by determining that the application did not send one of logout responses 212.

The systems described herein may determine that an application has not sent a logout response in a variety of ways. In some examples, determination module 108 may determine that the application did not send the logout response within a predetermined amount of time. For example, if single sign-on service 204 does not receive the logout response within an expected period of time following the distribution of a logout request, determination module 108 may determine that the application was unable to log the user out. Furthermore, in some embodiments, determination module 108 may determine that the user is still logged into the application based on single sign-on service 204 receiving a response from the application indicating that the logout attempt failed.

Additionally or alternatively, determination module 108 may determine that the application was unresponsive and/or unavailable at the time single sign-on service 204 sent the logout request to the application. For example, not receiving the logout request may serve as an indication that the application was unresponsive and therefore unable to log out the user. In addition, determination module 108 may query and/or test the application to determine if the application and/or the network connection between single sign-on service 204 and the application is responsive or otherwise functioning properly.

In some examples, presentation module 110 may notify the user that the user is still logged into the application in response to determination module 108 determining that the application did not send the logout response. For example, presentation module 110 may update user interface 214 and/or create a new user interface to alert the user that logout attempt 208 was unsuccessful. In some examples, presentation module 110 may alert the user that logout attempt 208 was unsuccessful by displaying the name and/or number of all applications that did not send a logout response to single sign-on service 204.

Additionally, in some embodiments, presentation module 110 may prompt the user to log out of the application. For example, presentation module 110 may prompt the user, via user interface 214 or an additional user interface, to log out of the application directly (e.g., by clicking a "log out" or "sign out" button). In addition, presentation module 110 may prompt the user to close any open browser windows rendering the application, clear cookies or other data stored in the browser, and/or logout of the application in any suitable manner. In this way, the systems described herein may ensure that the user is successfully logged out of all applications accessed via single sign-on service 204, even if an initial logout attempt failed.

Figure 5:
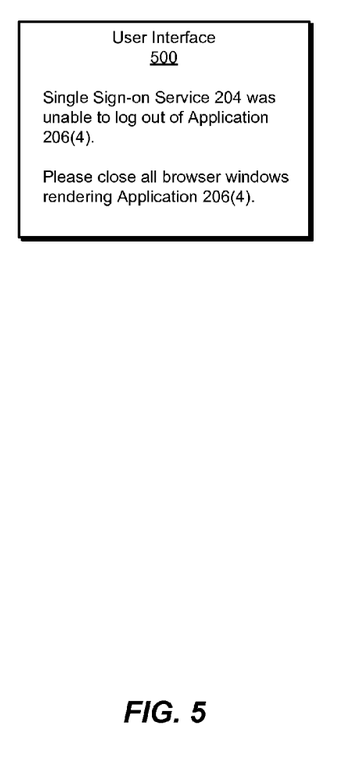
FIG. 5 is an illustration of an exemplary graphical user interface that prompts a user to log out of a cloud-based application.

As a continuation of the example of FIG. 4, FIG. 5 shows user interface 500. As shown in FIG. 5, user interface 500 may notify the user that single sign-on service 204 was unable to log the user out of application 206(4). In addition, user interface 500 may prompt the user to log out of application 206(4) by closing all browser windows rendering application 206(4).

Furthermore, in some examples, determination module 108 may determine that the user has been successfully logged out of the application after logout attempt 208 failed. For example, determination module 108 may determine that the user manually logged out of the application and/or closed a browser window rendering the application. In addition, determination module 108 may determine that the application sent the logout response to single sign-on service 204 (e.g., after the predetermined amount of time). Additionally or alternatively, determination module 108 may determine that the user has been successfully logged out of the application by querying and/or testing the application (e.g., by directing single sign-on service 204 to send another logout request to the application).

Once determination module 108 determines that the user has been successfully logged out of the application, presentation module 110 may notify the user that the user has been successfully logged out of each of applications 206(1)-(N). For example, presentation module 110 may update user interface 214 or create an additional user interface to alert the user that the user has been successfully logged out. In this way, the systems described herein may assure the user that private and/or confidential information stored within applications 206(1)-(N) is not accessible to unauthorized users or entities due to an unsuccessful logout attempt.

The systems and methods described herein may be implemented in a variety of ways and provide a number of advantages. As was explained above, by tracking both logout requests distributed by a single sign-on service to a set of cloud-based applications and the logout responses distributed from these cloud-based applications, the disclosed systems and methods may determine whether a user has been successfully logged out of each of the applications. In addition, if a user is not successfully logged out of an application, the systems and methods described herein may prompt the user to log out of the application. As such, the disclosed systems and methods may ensure that a user does not inadvertently remain logged into an application, therefore increasing the safety and security of information stored within the application.

Figure 6:
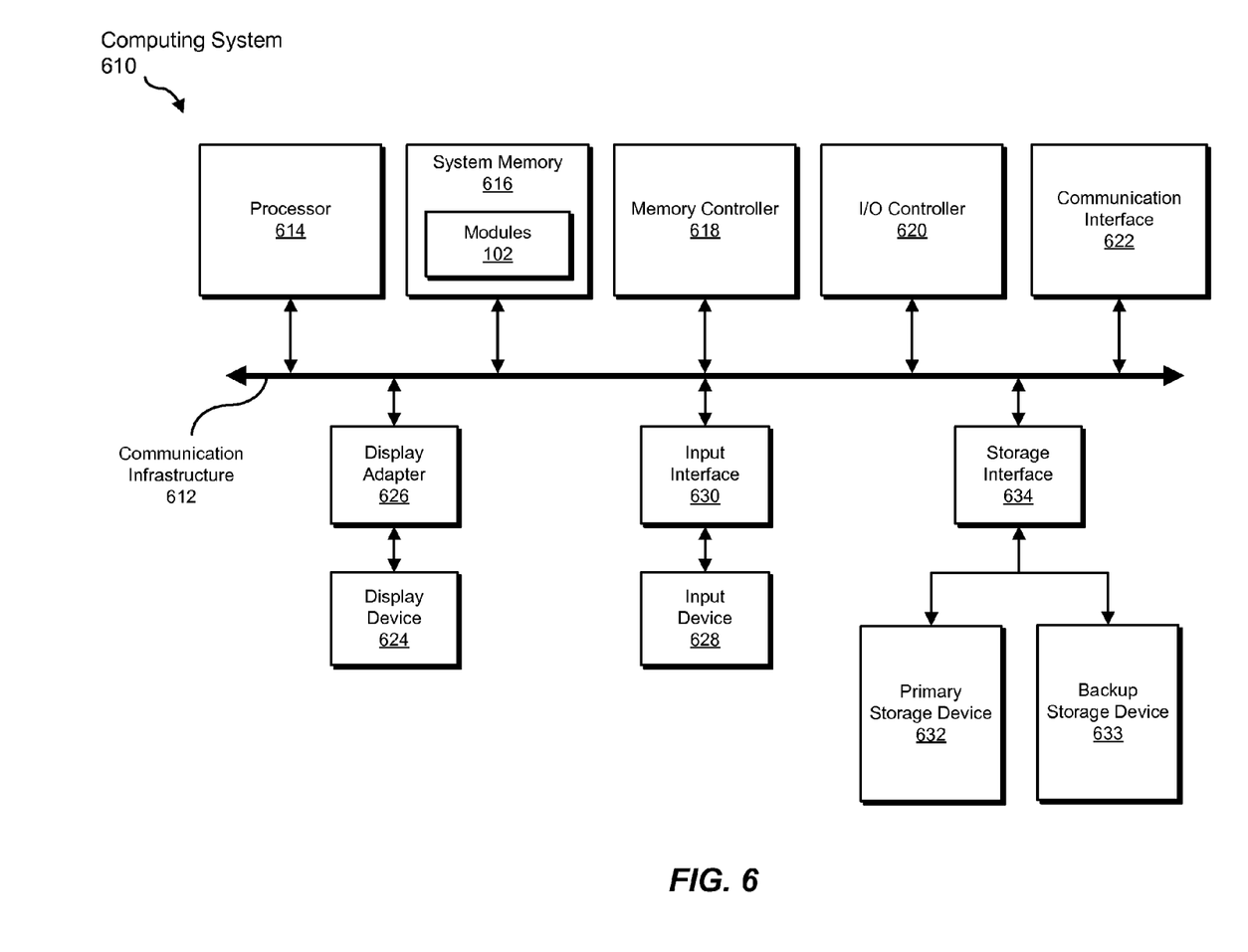
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
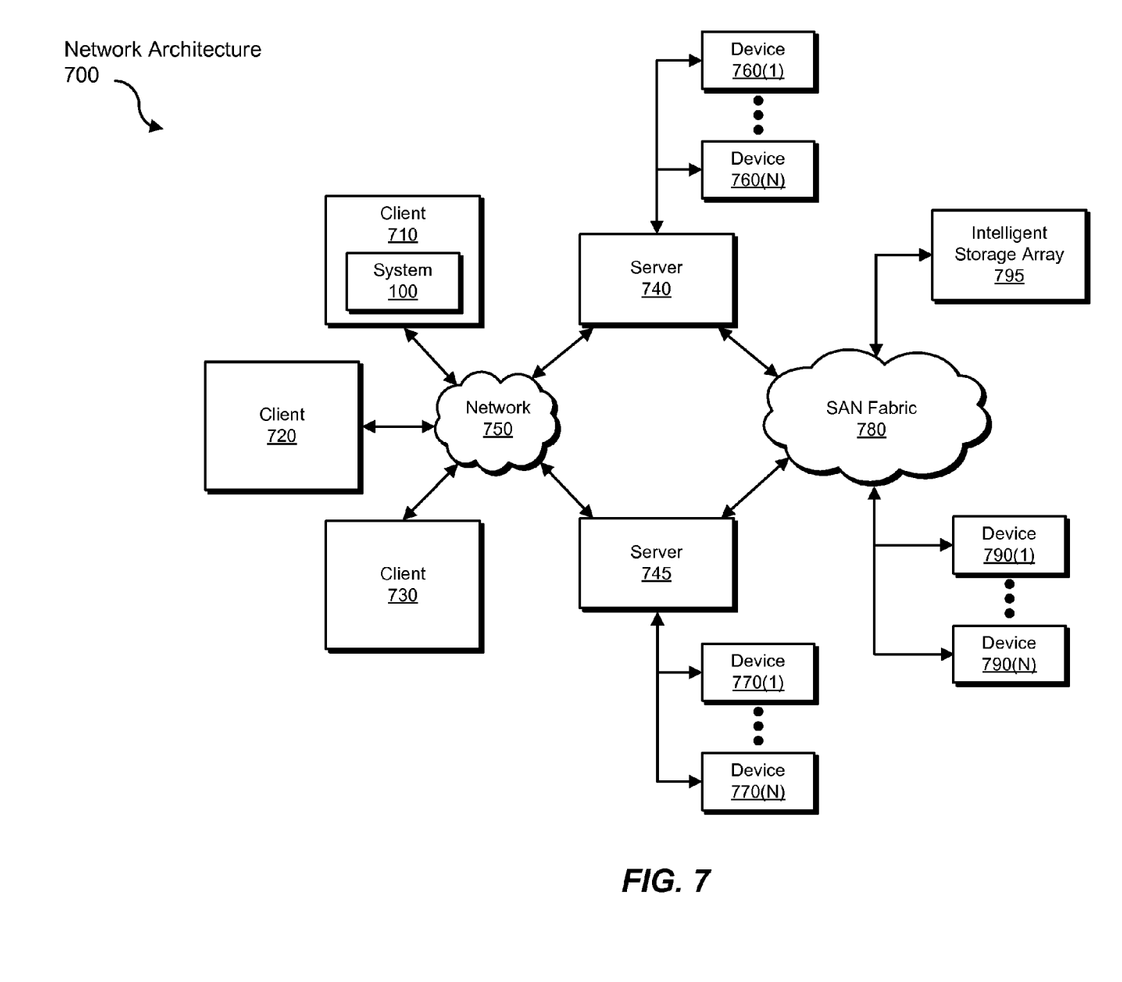
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for logging out of cloud-based applications managed by single sign-on services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive logout responses from cloud-based applications, transform the logout responses, output a result of the transformation to a user, and use the result of the transformation to ensure that the user is logged out of the cloud-based applications. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for logging out of cloud-based applications managed by single sign-on services, at least a portion of the method being performed by a computing device comprising at least one processor, the method comprising:

identifying, by a client agent running on a computing device of a user, an attempt, initiated by the user on the computing device and performed by a single sign-on service, to log the user out of a set of cloud-based applications managed by the single sign-on service and not managed by the client agent, at least a portion of the set of cloud-based applications being hosted in a separate domain than the client agent;

in response to identifying the attempt to log the user out of the set of cloud-based applications, tracking, by a script implemented by the client agent that is capable of monitoring cross-domain communications from the domain in which the portion of the set of cloud-based applications are hosted, a logout status of each application within the set of cloud-based applications by, for each application:
  identifying a logout request sent by the single sign-on service to the application via a protocol limited by cross-domain restrictions; and
  determining whether the application has sent a logout response via the protocol limited by cross-domain restrictions to the single sign-on service that verifies that the user has been successfully logged out of the application; and
determining that the user is still logged into at least one application managed by the single sign-on service by determining that the application did not send a logout response to the single sign-on service that verifies that the user has been successfully logged out of the application.

2. The method of claim 1, wherein determining that the application did not send the logout response to the single sign-on service comprises determining that the application did not send the logout response within a predetermined amount of time.

3. The method of claim 1, wherein determining that the application did not send the logout response to the single sign-on service comprises determining that the application was unresponsive at a time the single sign-on service sent the logout request.

4. The method of claim 1, wherein tracking the logout status of each application further comprises:
  presenting to the user, via a graphical user interface, a number of applications that the single sign-on service is attempting to log the user out of; and
  presenting to the user, via the graphical user interface, the number of applications that the user has been successfully logged out of.

5. The method of claim 4, wherein presenting to the user the number of applications that the user has been successfully logged out of comprises dynamically updating the number of applications that the user has been successfully logged out of as each logout response is received by the single sign-on service.

6. The method of claim 1, further comprising, in response to determining that the user is still logged into the application:
  notifying the user that the user is still logged into the application; and
  prompting the user to log out of the application.

7. The method of claim 6, wherein prompting the user to log out of the application comprises at least one of:
  prompting the user to log out of the application directly instead of logging out of the single sign-on service; and
  prompting the user to close an open browser window rendering the application.

8. The method of claim 6, further comprising:
  determining that the user has been successfully logged out of the application; and
  in response to determining that the user has been successfully logged out of the application, notifying the user that the user has been successfully logged out of each of the set of cloud-based applications managed by the single sign-on service.

9. A system for logging out of cloud-based applications managed by single sign-on services, the system comprising:
  an identification module, stored in memory, that identifies, by a client agent running on a computing device of a user, an attempt, initiated by the user on the computing device and performed by a single sign-on service, to log the user out of a set of cloud-based applications managed by the single sign-on service and not managed by the client agent, at least a portion of the set of cloud-based applications being hosted in a separate domain than the client agent;
  a tracking module, stored in memory, that in response to identifying the attempt to log the user out of the set of cloud-based applications, tracks, by a script implemented by the client agent that is capable of monitoring cross-domain communications from the domain in which the portion of the set of cloud-based applications are hosted, a logout status of each application within the set of cloud-based applications by, for each application:
    identifying a logout request sent by the single sign-on service to the application via a protocol limited by cross-domain restrictions; and
    determining whether the application has sent a logout response via the protocol limited by cross-domain restrictions to the single sign-on service that verifies that the user has been successfully logged out of the application;
  a determination module, stored in memory, that determines that the user is still logged into at least one application managed by the single sign-on service by determining that the application did not send a logout response to the single sign-on service that verifies that the user has been successfully logged out of the application; and
  at least one processor that executes the identification module, the tracking module, and the determination module.

10. The system of claim 9, wherein the determination module determines that the application did not send the logout response to the single sign-on service by determining that the application did not send the logout response within a predetermined amount of time.

11. The system of claim 9, wherein the determination module determines that the application did not send the logout response to the single sign-on service by determining that the application was unresponsive at a time the single sign-on service sent the logout request.

12. The system of claim 9, wherein a presentation module further tracks the logout status of each application by:
  presenting to the user, via a graphical user interface, a number of applications that the single sign-on service is attempting to log the user out of; and
  presenting to the user, via the graphical user interface, the number of applications that the user has been successfully logged out of.

13. The system of claim 12, wherein the presentation module presents to the user the number of applications that the user has been successfully logged out of by dynamically updating the number of applications that the user has been successfully logged out of as each logout response is received by the single sign-on service.

14. The system of claim 9, wherein, in response to determining that the user is still logged into the application:
  a presentation module notifies the user that the user is still logged into the application; and
  the presentation module prompts the user to log out of the application.

15. The system of claim 14, wherein the presentation module prompts the user to log out of the application by at least one of:

prompting the user to log out of the application directly instead of logging out of the single sign-on service; and prompting the user to close an open browser window rendering the application.

16. The system of claim 15, wherein:

the determination module determines that the user has been successfully logged out of the application; and in response to determining that the user has been successfully logged out of the application, the presentation module notifies the user that the user has been successfully logged out of each of the set of cloud-based applications managed by the single sign-on service.

17. A non-transitory computer-readable medium comprising one or more computer-executable instructions that, when executed by at least one processor of a computing device, cause the computing device to:

identify, by a client agent running on a computing device of a user, an attempt, initiated by the user on the computing device and performed by a single sign-on service, to log the user out of a set of cloud-based applications managed by the single sign-on service and not managed by the client agent, at least a portion of the set of cloud-based applications being hosted in a separate domain than the client agent;

in response to identifying the attempt to log the user out of the set of cloud-based applications, track, by a script implemented by the client agent that is capable of monitoring cross-domain communications from the domain in which the portion of the set of cloud-based applications are hosted, a logout status of each application within the set of cloud-based applications by, for each application:

identifying a logout request sent by the single sign-on service to the application via a protocol limited by cross-domain restrictions; and determining whether the application has sent a logout response via the protocol limited by cross-domain restrictions to the single sign-on service that verifies that the user has been successfully logged out of the application; and determine that the user is still logged into at least one application managed by the single sign-on service by determining that the application did not send a logout response to the single sign-on service that verifies that the user has been successfully logged out of the application.

18. The computer-readable medium of claim 17, wherein the computer-executable instructions cause the computing device to track the logout status of each application by:

presenting to the user, via a graphical user interface, a number of applications that the single sign-on service is attempting to log the user out of; and presenting to the user, via the graphical user interface, the number of applications that the user has been successfully logged out of.

19. The computer-readable medium of claim 17, wherein the computer-executable instructions cause the computing device to, in response to determining that the user is still logged into the application:

notify the user that the user is still logged into the application; and prompt the user to log out of the application.

20. The computer-readable medium of claim 17, wherein the computer-executable instructions cause the computing device to:

determine that the user has been successfully logged out of the application; and in response to determining that the user has been successfully logged out of the application, notify the user that the user has been successfully logged out of each of the set of cloud-based applications managed by the single sign-on service.

* * * * *